United States Patent [19]

Hendricks

[11] 3,709,663
[45] Jan. 9, 1973

[54] METHOD OF DETECTING OXYGEN IN A GAS

[75] Inventor: Herbert D. Hendricks, Hampton, Va.

[73] Assignee: The United States of America as represented by the Administrator of the National Aeronautics and Space Administration

[22] Filed: Aug. 17, 1971

[21] Appl. No.: 172,459

[52] U.S. Cl..............23/232 R, 23/232 E, 23/254 R, 23/254 E, 250/71 R, 250/83.3 UV
[51] Int. Cl..........................G01n 21/22, G01n 21/34
[58] Field of Search..............23/232 E, 254 E; 73/23; 250/43.5, 71, 83.3 UV

[56] References Cited

UNITED STATES PATENTS 3,612,866  10/1971  Stevens..............................23/254 X

*Primary Examiner*—Morris O. Wolk
*Assistant Examiner*—R. E. Serwin
*Attorney*—Howard J. Osborn et al.

[57] ABSTRACT

The presence of oxygen in a gas is detected by contacting an article, such as a film, comprising poly(ethylenenaphthalenedicarboxylate) with a gas and simultaneously exposing the article to ultraviolet light. The article is subsequently heated and the presence of oxygen in the gas is indicated by thermoluminescence.

7 Claims, 2 Drawing Figures

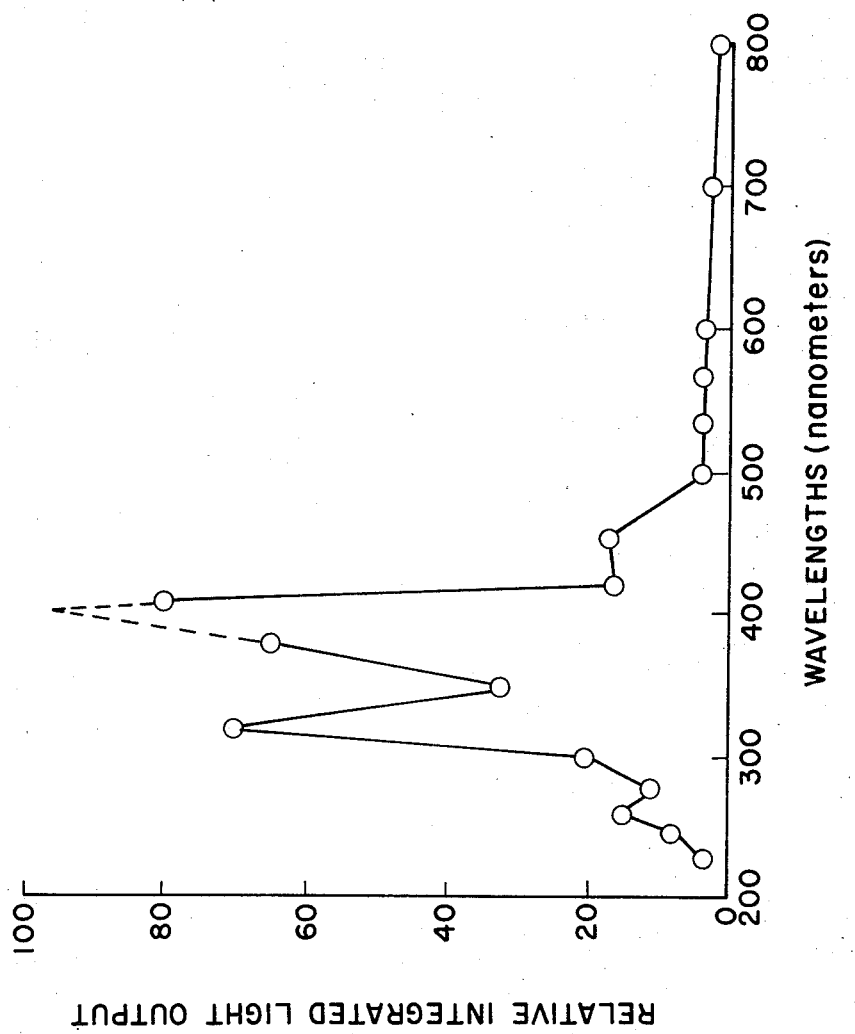

3,709,663

METHOD OF DETECTING OXYGEN IN A GAS

The invention described herein was made by an employee of the United States Government and may be manufactured and used by or for the Government for governmental purposes without the payment of any royalties or therefor.

BACKGROUND OF THE INVENTION

The present invention relates to a method for detecting the presence of oxygen in a gas. In one aspect, the invention relates to a method for detecting the presence of oxygen in a gas and, in another aspect, to a method of determining the amount of oxygen in a gas.

There many known methods of determining the presence of oxygen in a gas. However, several of these methods require the use of devices that are cumbersome, expensive, or both and there is a need for a simple and inexpensive reliable technique. This need is particularly acute in spacecraft and other installations where weight and bulkiness are of primary importance.

It is an object of the present invention to provide a simple and reliable technique for detecting the presence of oxygen in a gas. It is still a further object to provide such a technique which can be utilized to determine the amount of oxygen present in a gas.

BRIEF SUMMARY OF THE INVENTION

The foregoing and other objects which will be apparent to those having ordinary skill in the art are achieved according to the present invention by providing a method including the steps of exposing a poly(ethylenenaphthalenedicarboxyplate) article to ultraviolet light and simultaneously contacting the article with a gas, subsequently heating the exposed article to a temperature of at least about 70° C, preferably about 130° C, and detecting thermoluminescence induced by said heating. The amount of oxygen in the gas can be determined by employing conventional testing apparatus to measure the amount of thermoluminescence.

DETAILED DESCRIPTION

Figure 1:
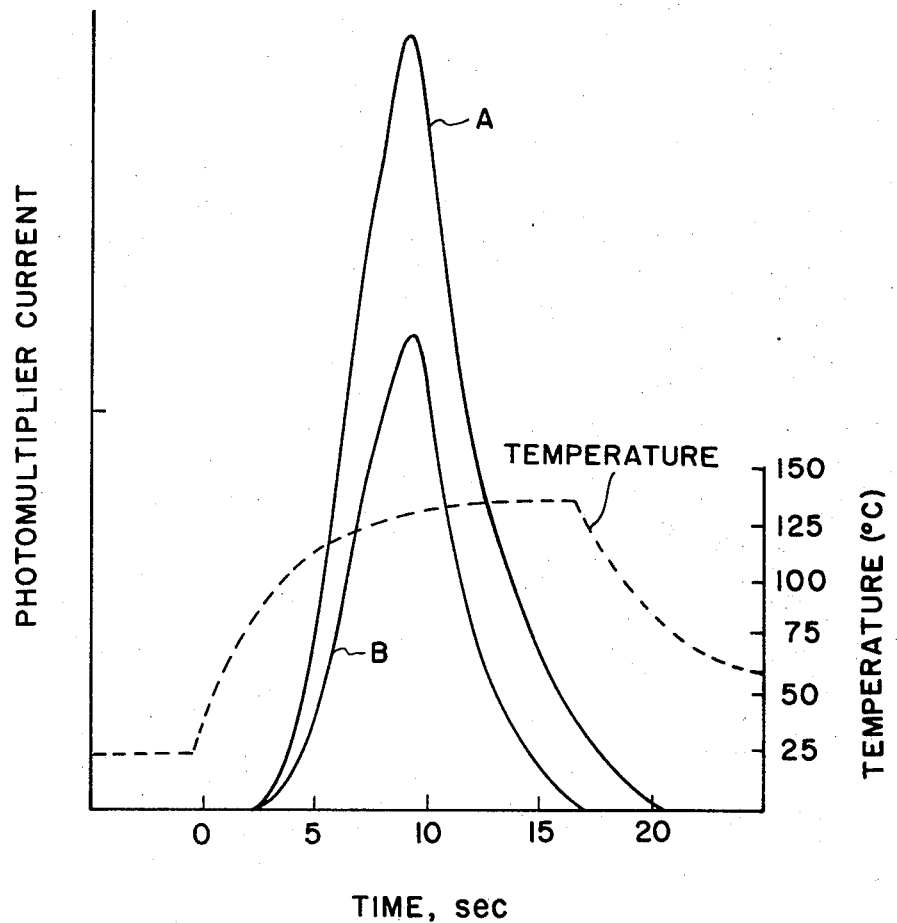

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations that will be readily apparent to those skilled in the art without departing from the spirit and scope of the invention.

FIG. 1 is a schematic representation of thermoluminescence as a function of time for gas samples with different amounts of oxygen, and of heating temperature used to induce thermoluminescence as a function of time; and FIG. 2 is a curve showing the relationship between thermoluminescence and the wavelength of incident light.

Discs of poly(ethylenenapthalenedicarboxylate) are provided in 0.254 mm thickness and 7.35 mm diameter. The film is commercially available poly(ethylene-2,6-napthalenedicarboxylate) having a glass transition temperature of 130° C and a melting point of 255° C.

The film samples are cleaned with absolute ethanol and then stored in a desiccator until used. When a measurement is to be made, a sample is placed in a quartz tube and degassed by heating at 130° C and vacuum pumping to $5 \times 10^{-2}$ torr for a period of 2 hours. This is done in order to start each sample with the same prior history. After this sequence, a gas to be tested is admitted into the sample tube at atmospheric pressure and allowed to contact with the film. (This sequence of degassing the sample and reaction of the gas is not essential to produce luminescence and is included to have a standard point of reference for each sample. Preliminary test samples showed thermoluminescence after exposure to ambient room conditions including fluorescent lights). The sealed quartz tube and the gas and sample disc therein are then exposed to ultraviolet light from a 150-watt dispersed-beam xenon lamp. The light intensity in the area of the samples is approximately 0.23 mW/cm$^2$ as determined by a TRW Model 43A radiometer. The samples are exposed for various lengths of time to the ultraviolet radiation. The control time of exposure for most tests is 16 hours unless otherwise indicated. The samples are next removed from the quartz tube and immediately evaluated as described below.

A Madison Research Company Model S-2L TLD system and associated test accessories is used to measure the total thermally stimulated luminescence from the sample disc. A sample to be evaluated is placed in the silver heater pan and then heated to 130° C in 15 seconds. The total thermally stimulated luminescence is detected by an Electra Megadyne, Inc. (EMI) photomultiplier (9536S) which is an integral part of the TLD system. A test sequence is conducted to determine the luminescence as a function of the heater-timer temperature cycle. The results of this study show that the relative integrated light output (RILO) slowly increases from approximately 71° until a maximum value is reached around 130°. At temperatures higher than 130°, there is a leveling off or a decrease of the luminescence output. At temperatures higher than 180°, bubbles begin to form in the samples. The time interval of 15 seconds was chosen to give a high temperature rise per unit of time in order to observe any individual emission peaks in the luminescence output. FIG. 1 shows a typical readout from the TLD system used during the experiment. The common parameter for all of the data on the figure is time on the abscissa. The dashed curve indicates the temperature cycle and the two solid curves the photomultiplier current output due to luminescence of a sample disc contacted with gas samples containing different amounts of oxygen.

The spectral distribution of the luminescence is measured with the aid of Optics Technology, Inc., Spectrocoat monopass filters (bandpass at full width half maximum was less than 20 nm) placed in the TLD system between the sample and the photomultiplier. The same filters were used to identify the wavelengths of light most effective in exciting the photochemical reactions in the polymer film.

Several initial tests were made that indicated that thermally stimulated luminescence from the polymer film could be obtained simply by exposing the samples to room conditions, which included fluorescent lamp illumination, and then heating in the silver pan of the TLD system. To reproduce and evaluate various parameters, a controlled test sequence was utilized. It was found that samples would not luminesce if kept in darkness. Also, a sample that would repeatedly luminesce would not do so if kept in a vacuum. However, a sample exposed to air or oxygen and ultraviolet would luminesce even after repeated cycling. Therefore, it is necessary to have both ultraviolet radiation and oxygen or air present for a reaction with the polymer before luminescence could occur. Another means of measuring the effect of the gaseous environment on the process is by monitoring the relative integrated light output due to the luminescence process. A typical example for gases containing different amounts of oxygen is shown in FIG. 1. Curve A shows luminescence (as indicated by photomultiplier output) as a function of time for a first gas sample having a relatively large amount of oxygen, and Curve B represents luminescence as a function of time for a second gas sample having a less amount of oxygen. As will be seen, both the peak of Curve B and the area under Curve B (relative integrated light output) provide an indication of the quantity of oxygen in the gas being analyzed. Accordingly, the present system can be utilized to make quantitative determinations, simply by providing a series of curves as shown in FIG. 1 for known gases and known exposure conditions and comparing these with curves produced from samples contacted with gases having unknown quantities of oxygen.

While in the foregoing examples, samples were exposed to a light intensity of about 0.23 mW/cm² for about 16 hours, much less exposure can be used. For example, using identical equipment, excellent results are obtained after 2 hours exposure. The minimum amount of exposure required is largely a function of the sensitivity of the detection equipment used. However, in general, a practical minimum exposure time is about 5 or 10 minutes and a practical minimum intensity is about that of room light or 20 to 30 foot-candles.

A determination was made of the effect of other gases such as He, $N_2$, $CO_2$, Ar, and nitrous oxide on the luminescence process, but contributions to light output were insignificant when compared to oxygen. During the investigation of the effect of temperature and time cycle on the luminescence of the polymer film it was found that the luminescence emission occurred at temperatures above about 70° C. The effect of the beginning of the luminescence and the upswing of the glass transition temperature was briefly investigated. There is an inflection point at about 130° C in the curve showing relative integrated light output as a function of temperature. The glass transition temperature as determined by torsional braid analysis is near 130° C and it is reasonable to conclude that there is a connection between the observed luminescence and freedom of movement of the polymer chain segments.

A series of tests was conducted to determine the lifetime of the luminescence reaction. This series of tests was conducted over a period of over 400 hours. It was found that the luminescence process was still active after this period of time even though the samples were stored in vacuum and darkness. The luminescence output after this series of tests was still approximately 30 percent of that at the start of the test. Therefore, the process is a long-lived one. Another brief investigation was made of some 22 other monomers, polymers, and inorganic compounds including Mylar, polyethylene, and the monomer of poly(ethylene-2,6-napthalenedicarboxylate) under similar test conditions. No significant luminescence was observed in any of the other materials.

As ultraviolet light was exciting the oxygen-polymer system, the wavelengths of excitation were determined. By using the monopass filters previously described, a number of samples were exposed to different wavelengths of light. The resultant thermally stimulated luminescence for all wavelengths of emission is shown in FIG. 2 as a function of the excitation wavelength. The dashed line portion of the curve indicates extrapolation. The excitation wavelength region investigated was from 230 to 800 nm. From the figure, it can be seen that the prime wavelengths exciting the reactions are approximately 330 and 390 nm, and that a suitable range is from about 300 to about 430 nm. Wavelengths of emission from the PEN 2,6 centered around 400 and 465 nm and ranged from 370 to 500 nm. It has been determined that the luminescence is deactivated by degassing after a thermal cycle. Thus, polymer films can be re-used after the stimulation of the luminescence process.

While the invention has been disclosed in connection with precise measuring equipment, it will be apparent that the presence of oxygen can be very simply determined by contacting film with the gas in question in the presence of ultraviolet light and subsequently heating to about 100° C to observe the existence of luminescence. The ultraviolet light does not need to be intense, ordinary sunlight or the room-light from fluorescent lamps being sufficient. In space applications, of course, no external light source is necessary and in dark places such as mines, undersea, etc., a small and conventional source of ultraviolet light is suitable.

What is claimed is:

1. A method of detecting the presence of oxygen in a gas comprising the steps of: exposing an article comprising poly(ethylenenaphthalenedicarboxylate) to ultraviolet light and simultaneously contacting the article with a gas; heating the exposed article to a temperature of at least about 70° C; and detecting thermoluminescence induced by said heating.

2. A method according to claim 1 wherein said article comprises a film of poly(ethylene-2,6-naphthalenedicarboxylate).

3. A method according to claim 1 wherein the exposed article is heated at a temperature of up to about 180° C.

4. A method according to claim 1 wherein the exposed article is heated at about the glass transition temperature of poly(ethylenenapthalenedicarboxylate).

5. A method according to claim 1 including the step of measuring the amount of thermoluminescence induced by said heating.

6. A method according to claim 5 including the further step of determining the amount of oxygen present in said gas from the measured amount of thermoluminescence.

7. A method according to claim 1 wherein the ultraviolet light has a wavelength of from 300 to about 430 nm.

* * * * *